UNITED STATES PATENT OFFICE.

CARLTON H. MARYOTT, OF DALLAS, TEXAS.

PROCESS FOR REDUCTION OF UNSATURATED FATTY ACIDS AND THEIR ESTERS.

1,097,456.  Specification of Letters Patent.  Patented May 19, 1914.

No Drawing.  Application filed November 30, 1912.  Serial No. 734,302.

*To all whom it may concern:*

Be it known that I, CARLTON H. MARYOTT, a citizen of the United States, residing at Dallas, in the county of Dallas and State of Texas, have invented certain new and useful Improvements in Processes for Reduction of Unsaturated Fatty Acids and Their Esters, of which the following is a specification.

It has been known for sometime that unsaturated fatty substances are reduced by hydrogen in the presence of certain finely divided metals, particularly nickel and the platinum metals, which act catalytically, and various inventions have been made for bringing the fatty substance, hydrogen and catalyzer into proper contact under conditions suitable for a rapid reduction.

In the process which forms the basis of this invention, the fats or fatty acids are dissolved in some fat solvent, such as alcohol, acetone, ether, petroleum ether, benzene, chloroform, carbon disulfid, carbon tetrachlorid, or other fat solvent and the fat or fatty acid, while in the solvent, is subjected to the action of hydrogen in the presence of some catalyzer, preferably palladium. It is not necessary that the fatty substance be completely dissolved in the solvent, for triolein, for instance, in alcohol at a temperature below that at which it is completely soluble, is readily reduced in the presence of finely divided palladium. In general, a solution containing about twenty-five to fifty per cent. of fat is preferable.

The process can be carried out in a reaction chamber provided with an agitator and suitable means for regulating the temperature and gas pressure. The solution of the fat or fatty acid in the fat solvent containing in suspension the catalyzer preferably deposited out on some finely divided material as asbestos is introduced into the chamber, and kept agitated to insure a uniform mixing with the catalyzer, while the temperature is suitably regulated and the hydrogen conducted into the chamber under appropriate pressure. While the unsaturated fatty bodies, when dissolved, for instance, in alcohol or acetone, are hydrogenized in the presence of finely divided palladium at room temperature under atmospheric pressure, a higher temperature and a greater pressure favor the reduction. However, the process is not restricted to any particular range of temperature or pressure. After the reduction has proceeded sufficiently far, as shown by the analyses of samples withdrawn, the mixture is removed from the reaction chamber, the catalyzer separated by filtration, and the solvent distilled off either at atmospheric pressure or at reduced pressure, or without distilling off the solvent the reduced fatty substance may be largely removed by cooling and filtering off the separated fat.

Instead of agitating the solution of the fat or fatty acid in the reaction chamber, the solution containing the suspended catalyzer, can be sprayed by means of an atomizer into a chamber of hydrogen, and after sufficient action, the mixture can be treated as above for the removal of the catalyzer and the solvent.

This process differs from other processes for reduction of fats and fatty acids in that the fatty substance is dissolved completely or partially in some fat solvent and then subjected to the action of hydrogen in the presence of a catalyzer, while in the solvent. The influence of the solvent in facilitating the action of the hydrogen on the fat or fatty acid in solution might find an explanation in the better opportunity afforded by the solvent for the accumulation of the hydrogen and fatty substance at the surface of the catalyzer, due to freer diffusion of the reacting substances. While this might be a possible explanation of the influence of the solvent, a complete or correct explanation is not claimed. I have found that benzene, gasolene and ether are solvents which very greatly increase the speed of the reaction.

I am aware of an experiment described by Paal and Roth, in *Berichte der Deutche Chemischen Gesellschaft*, volume 41, page 2287, in which experiment .5 grams of castor oil is dissolved in 13 c. c. of absolute alcohol and 6 c. c. of hydrosol of colloidal palladium, containing .08 grams of colloidal palladium (corresponding to .05 grams of metallic palladium) is placed in a gas burette and a known volume of gas is allowed to stand in contact with said mixture of oil, alcohol, water and colloidal palladium, but under these conditions there can be no acceleration of the reaction, due to the presence of the solvent on account of the fact that 12 times as much water as of oil are added, and moreover 26 times as much absolute alcohol as oil are added, and the oil is so much diluted with the other materials present, that the action of the hydrogen on the oil is extremely slow, said action having been continued for 6 hours, during all of which time the action was still going on, and no statement that the action was complete at the end of the 6 hours is given in said article.

I disclaim the use of colloidal palladium in connection with the hydrogenation of a fatty body, whether or not a known solvent of oily bodies is added.

I claim:—

1. A process of reducing unsaturated fatty bodies, which comprises bringing hydrogen into contact with said fatty bodies in the presence of a catalyzer comprising a metal of the palladium group, deposited upon a suitable carrier, and in the presence of a solvent of fatty bodies, in the absence of an excess of any liquid in which said fatty bodies are insoluble.

2. A method of reducing unsaturated fatty acids and their esters, which comprises passing hydrogen, at a suitable temperature and pressure, into a solution of said unsaturated fatty bodies in a fat solvent, while in the presence of metallic palladium, and while in the absence of large quantities of water, and while agitating said solution.

3. A method of reducing unsaturated fatty acids and their esters, which comprises passing hydrogen, at a suitable temperature and pressure, into a solution of said unsaturated fatty bodies in ether, while in the presence of a catalyzer comprising a metal of the palladium group deposited on a carrier, and while in the absence of large quantities of water, and agitating said solution.

4. A method of reducing normally liquid, unsaturated fatty acids and their esters which comprises causing hydrogen to act at suitable temperature and pressure, in the presence of a catalyzer comprising a metal of the palladium group, deposited upon a carrier, upon said unsaturated fatty bodies, in the presence of a fat solvent, and in the absence of material amounts of any liquid in which said fatty bodies are insoluble.

In testimony whereof I have signed my name to this specification in the presence of two subscribing witnesses.

CARLTON H. MARYOTT.

Witnesses:
J. S. MURRAY,
D. C. RAMSEY.